United States Patent

[11] 3,550,712

| [72] | Inventor | Friedrich Feldmann<br>Nieder-Modau, Germany |
|---|---|---|
| [21] | Appl. No. | 734,771 |
| [22] | Filed | June 5, 1968 |
| [45] | Patented | Dec. 29, 1970 |
| [73] | Assignee | Lawima-Holding<br>A. G. Zug, Switzerland<br>a body corporate of Switzerland |
| [32] | Priority | June 8, 1967 |
| [33] | | Germany |
| [31] | | No. 56,694 |

[54] MOTOR VEHICLE
4 Claims, 1 Drawing Fig.

[52] U.S. Cl.................................................... 180/53,
180/70
[51] Int. Cl..................................................... B60k 17/02,
B60k 25/06

[50] Field of Search.................................... 180/53, 70

[56] References Cited
UNITED STATES PATENTS
2,764,247  9/1956  Wiegman et al.............  180/53
FOREIGN PATENTS
875,365  8/1961  Great Britain................  180/53

*Primary Examiner*—A. Harry Levy
*Attorney*—Michael S. Striker

ABSTRACT: An agricultural tractor with a power takeoff has a clutch for limiting the torque applied by the engine to the transmission so that a higher powered engine can be used without modifying the transmission. The clutch can be the clutch used for disengaging the engine or it can be a separate clutch.

PATENTED DEC 29 1970
3,550,712
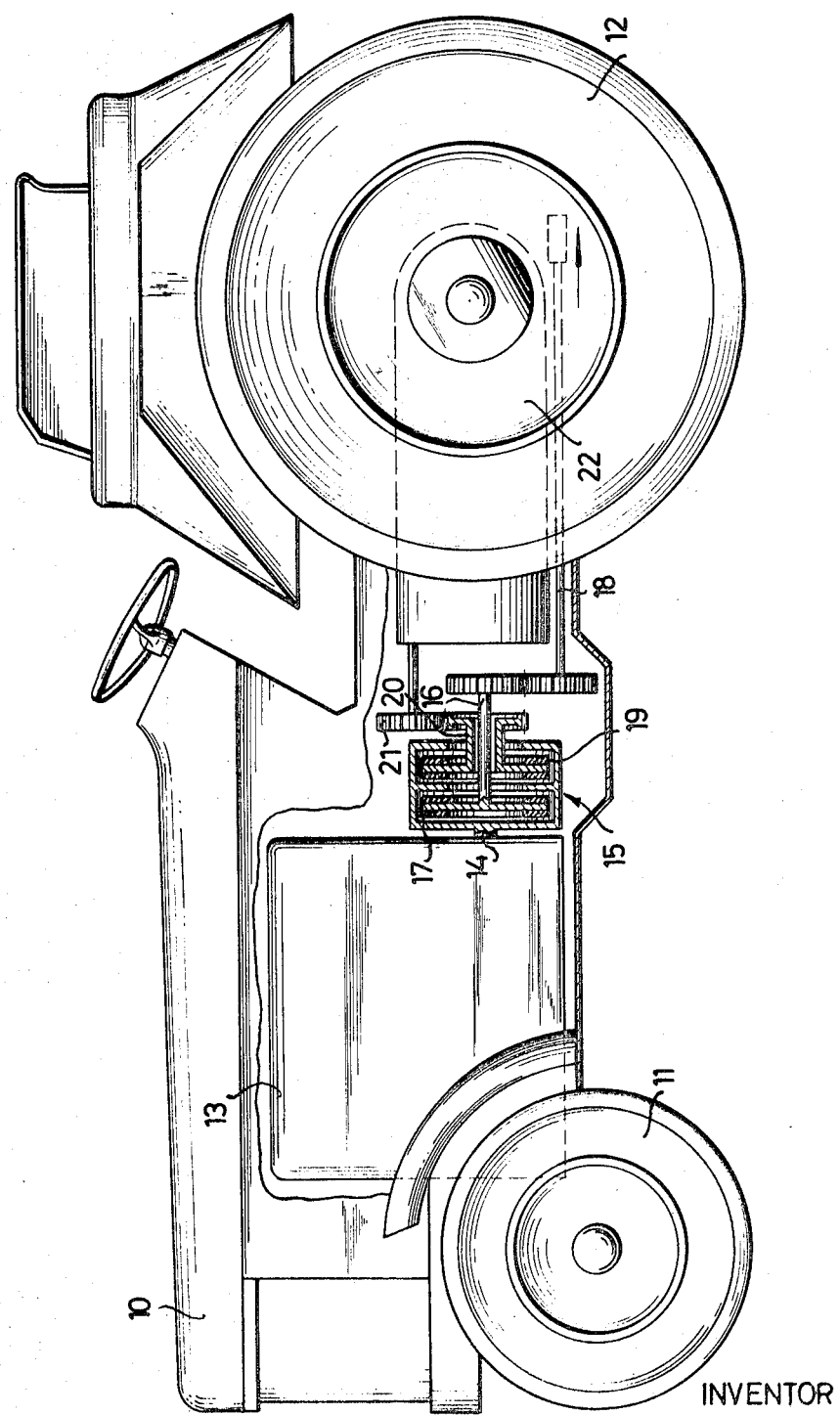
INVENTOR
Friedrich Feldmann
By: Michael S. Striker
Attorney

MOTOR VEHICLE

The invention relates to a motor vehicle particularly for agricultural purposes, such as a tractor, wherein the engine is connected to the traction drive by a clutch which limits the torque that can be transmitted, such as an engageable friction clutch, and is additionally used to drive equipment, preferably by way of a power takeoff. Strong driving engines are required for motor vehicles of this type, in order that the power requirement of the pieces of equipment can be satisfactorily covered even when relatively high. But since the normal practice with vehicles with only one driving engine is for the load capacity of the traction drive to be adapted to the available engine output, outlay on elements of the traction drive increases rapidly with the size of the engine. In some cases, moreover, known vehicles equipped with strong engines, such as tractors, are unwieldy because of their expensive traction drives and inconveniently heavy particularly for field work. As a means of reducing the purchase price and making handling more convenient therefore, tractors which only inadequately cover the power requirement of the associated equipment are frequently acquired.

The invention aims to provide motor vehicles particularly for agricultural purposes, such as tractors of the above type, which can be cheaply supplied and are convenient to handle in spite of the fact that they leave high driving power available for the associated pieces of equipment. In the realization that the maximum torque of a motor used both for the traction drive and for driving the high power capacity pieces of equipment which are nowadays customary or desirable cannot all be utilized for the traction drive alone, since relatively narrow limits are set to the latter particularly by the limited ground holding properties of the wheels, this aim may be achieved according to the invention, substantially in that a clutch incorporated in the traction drive is set to a maximum transmission torque which is less than the maximum engine torque. Whereas in known agricultural tractors the elements of the traction drive, allowing for any peak loads resulting from careless handling, are set to transmit with predetermined stability 1.6 to 2.2 times the maximum engine torque, from which an appropriate setting for the traction clutch can be obtained, in accordance with the invention the maximum torque which can be transmitted from the engine to the traction drive must be less than the maximum torque of the engine, so that only a fraction of the maximum engine torque can be reckoned with for the traction drive and accordingly for any possible stresses on the elements therefor. With the provision—according to the invention—of an overload safety device in the traction drive, which device responds at a value below the maximum torque of the engine, the possible stresses on the elements of the traction drive are limited to values independent of the maximum engine torque and such as can be absorbed in travel. The dimensions of the members of the traction drive are accordingly no longer dictated to a certain extent by the maximum torque of the engine, as in known constructions, and can be selected purely according to the stresses expected to be imposed on the traction drive. Thus even relatively light vehicles such as tractors can be equipped with driving engines of virtually any strength so that even high power capacity pieces of equipment can be used to optimum effect. It is possible, for example, for an engine of a commercial tractor supplying a given maximum torque to be replaced by an engine with a far higher maximum torque, e.g. twice the original torque, and nevertheless to maintain the traction drive in its original form without there being any fear of damage. All that is necessary is to limit the maximum torque which can be transmitted to the traction drive to a value corresponding to the original engine, i.e. to keep it below the maximum torque of the replacement engine, by means of the overload protection device provided according to the invention. The extra cost of a motor vehicle suitable e.g. for operating a combine harvester, rotary hoe or the like with twice the original performance is accordingly restricted to the difference in price between the differently powered engines, which is usually relatively small, and the additional expenditure on the overload protection device, which can be kept low.

The invention may take various different forms. In a preferred embodiment the maximum transmissible torque of a clutch incorporated in the traction drive is 0.8 of the maximum engine torque. This makes it possible, while observing known safety factors, to take a given vehicle virtually without changing the drive elements and to use an engine with e.g. twice the maximum torque without exposing the drive elements to any greater risk.

It will usually be desirable for the engageable friction clutch which is in any case located in the traction gear to be of a size and construction such that the maximum transmissible torque is limited to a value less than the maximum torque of the engine. It is also possible to include in the traction drive an overload safety device in the form of a clutch arrangement which limits the transmissible torque to a value below the maximum torque of the engine, in addition to having an engageable friction clutch for travel. In this case it is advisable to use a so-called slip clutch or the like to restrict the transmissible torque to a predetermined value.

The invention is illustrated in the accompanying drawing, which is a diagram showing the appropriate part of a tractor.

The example is based on a tractor 10 having steering wheels 11 and drive wheels 12. It is equipped with an engine 13 which carries the drive portion 15 of a double clutch known per se nonrotatably on its drive shaft 14. The double clutch comprises a portion 17 which drives a power takeoff 18 and is connected to the latter by a solid shaft 16, and a portion 19 which is connected to the traction mechanism 22 by a hollow shaft 20 and a gear wheel 21. Whereas the previous practice was to make the traction mechanism 22 and hence the associated clutch portion 19 of a size such that it can transmit the maximum torque produced by the engine 13 to the wheels while making allowance for the required safety factors, in the construction according to the invention the travel clutch portion 19 is designed so that the torque which can be transmitted therein is less than the maximum torque of the engine 13. The traction mechanism 22 may accordingly be set independently of the maximum torque of the engine 13, i.e. be of lighter construction than was previously admissible.

Instead of restricting the maximum torque transmissible to the traction drive 22 in the traction clutch 19 it is possible, for example, to interpolate an overload safety device such as a slip clutch into the shaft extending between the gear wheel 21 and the traction drive 22, the clutch responding at a value below the maximum torque of the engine 13.

As already mentioned, the embodiment illustrated is only an example of the invention. The invention is not restricted to this and many other constructions are possible. The spatial arrangement and conformation of the overload safety device which keeps the torque transmissible to the traction mechanism 22 below the maximum torque of the engine 13 may be modified in many different ways.

I claim:

1. A motor vehicle comprising an engine having a predetermined torque greater than necessary for driving the vehicle; traction drive means for driving said motor vehicle; auxiliary equipment drive means; and transmission means for transmitting a drive from said engine to said traction drive means to said auxiliary drive means, said transmission means including means for limiting the torque transmitted from said engine to said traction drive means to a maximum torque which is smaller than the maximum engine torque but sufficient to drive said vehicle so that said traction drive means may be dimensioned to withstand only said smaller torque, said limiting means including a friction clutch having at least two friction disc elements mounted on a pair of coaxial shafts, one driven by the engine and the other forming part of said traction drive means.

2. A motor vehicle as defined in claim 1, wherein said limiting means limits the torque transmitted to said traction drive means to 0.8 of the maximum engine torque.

3. A motor vehicle as defined in claim 1, wherein said engine has an output shaft and wherein said transmission means includes a double clutch having a first clutch member connected to said output shaft for rotation therewith and a pair of additional clutch members respectively engageable with said first clutch member and gear means respectively connecting said pair of additional clutch members with said traction drive means and said auxiliary equipment drive means, the additional clutch member which is connected to said traction means constituting said limiting means.

4. A motor vehicle as defined in claim 3, wherein said one clutch member is a hollow cylindrical member and said additional clutch members are coaxially arranged in said hollow cylindrical member.